(12) United States Patent
Wiese et al.

(10) Patent No.: US 7,121,040 B2
(45) Date of Patent: Oct. 17, 2006

(54) COMBINATION FOLIAGE COMPACTION AND TREATMENT METHOD AND APPARATUS

(75) Inventors: Adam H. Wiese, Harshaw, WI (US); Daniel A. Netzer, Rhinelander, WI (US); Don Riemenschneider, Rhinelander, WI (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 74 days.

(21) Appl. No.: 10/336,900

(22) Filed: Jan. 6, 2003

(65) Prior Publication Data

US 2004/0003535 A1    Jan. 8, 2004

Related U.S. Application Data

(60) Provisional application No. 60/394,555, filed on Jul. 8, 2002.

(51) Int. Cl.
*A01M 21/04* (2006.01)

(52) U.S. Cl. .......................................... 47/1.7; 239/163
(58) Field of Classification Search ................... 47/1.5, 47/1.7, 58.156, 9; 239/147, 159, 172, 176, 239/743, 163
See application file for complete search history.

(56) References Cited

U.S. PATENT DOCUMENTS

| | | | |
|---|---|---|---|
| 2,696,696 A | 12/1954 | Tigerman | |
| 3,152,353 A | 10/1964 | Cravener | |
| 3,255,929 A | 6/1966 | De Haan | |
| 3,408,149 A | 10/1968 | Lakes | |
| 3,512,714 A * | 5/1970 | Phelps | 239/168 |
| 3,560,102 A | 2/1971 | Wetzel | |
| 3,599,866 A * | 8/1971 | Bolton | 239/8 |
| 3,959,924 A * | 6/1976 | Allen, Jr. | 47/1.43 |
| 3,977,605 A | 8/1976 | Sheldon | |
| 3,986,298 A * | 10/1976 | Ablett et al. | 47/1.7 |
| 3,995,569 A * | 12/1976 | Picardat | 111/12 |
| 4,088,473 A | 5/1978 | Linton | |
| 4,186,878 A * | 2/1980 | Lestradet | 239/160 |
| 4,208,835 A | 6/1980 | Roll et al. | |
| 4,223,479 A | 9/1980 | Burnside | |

(Continued)

OTHER PUBLICATIONS

Mayeux, H.S.; *Application of Herbicides on Reangelands with a Carpeted Roller: Evaluation of Four Herbicides for Control of Honey Mesquite*; May 1985; J. of Range Management, vol. 38(3), p. 233-237.

(Continued)

*Primary Examiner*—Jeffrey L. Gellner
(74) *Attorney, Agent, or Firm*—John D. Fado; Lesley D. Shaw; Janet I. Stockhausen

(57) ABSTRACT

Method and apparatus for applying liquids to foliage with a roller and adjustable spray nozzle apparatus. A large heavy roller is pulled or pushed across a field of plants, thereby forcing the plants very close to the ground. A height adjustable applicator nozzle directly following the roller can be adjusted very close to the compacted plants. The combination of an adjustable roller and adjustable applicator nozzles allows the fluid to be released very near the plants, thereby increasing the amount of fluid transferred to the plants' surface and lowering the amount of fluid sprayed into the atmosphere. This reduces the amount of fluid required to treat a given area. The result of the invention is a savings in the cost of fluids, improved effectiveness of the treatment and an improved environmental impact where the selected fluid has a negative environmental impact.

27 Claims, 3 Drawing Sheets

U.S. PATENT DOCUMENTS

Figure 1:
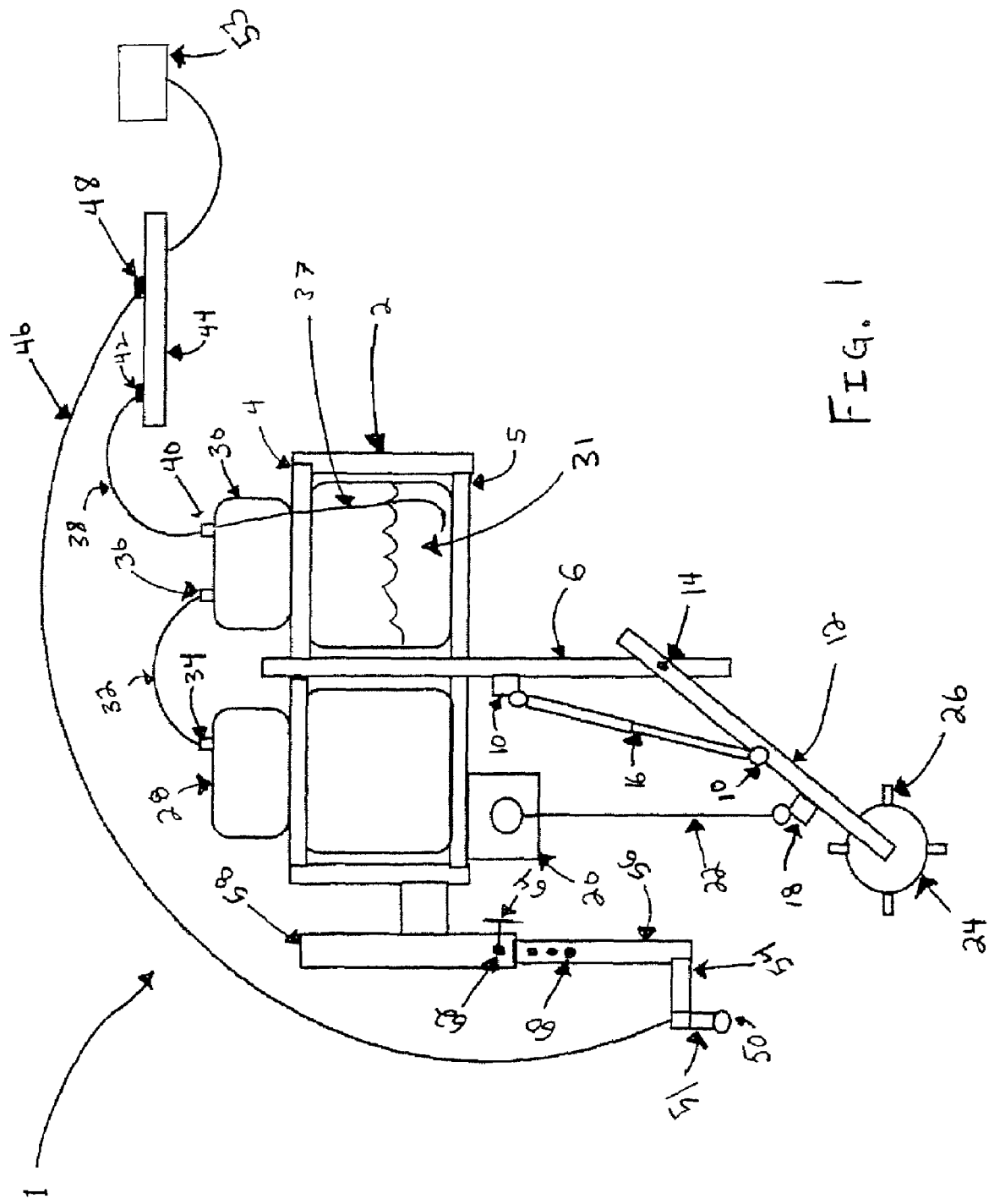

| | | | |
|---|---|---|---|
| 4,276,719 A | 7/1981 | Keeton et al. | |
| 4,305,224 A | 12/1981 | Maddock | |
| 4,315,602 A | 2/1982 | Kubacak et al. | |
| 4,347,684 A | 9/1982 | Keeton | |
| 4,353,505 A | 10/1982 | Kinder | |
| 4,443,970 A | 4/1984 | Randolph | |
| 4,488,376 A | 12/1984 | Wilson | |
| 4,546,570 A | 10/1985 | Schaeffer | |
| 4,569,486 A | 2/1986 | Balmer | |
| 4,629,123 A * | 12/1986 | Gorder | 239/159 |
| 4,641,781 A * | 2/1987 | McCrea et al. | 239/159 |
| 4,709,505 A | 12/1987 | Lempa | |
| 4,803,801 A | 2/1989 | Nelson | |
| 4,927,080 A * | 5/1990 | Alsing | 239/77 |
| 5,248,090 A | 9/1993 | Williamson | |
| 5,826,370 A | 10/1998 | Stevens | |
| 6,125,621 A | 10/2000 | Burch | |
| 6,167,821 B1 | 1/2001 | Beggs | |
| 6,190,077 B1 | 2/2001 | Newson et al. | |
| 6,289,829 B1 | 9/2001 | Fish et al. | |
| 6,295,757 B1 * | 10/2001 | Fields, II | 47/1.5 |
| 6,594,950 B1 * | 7/2003 | Johnson | 47/1.5 |

OTHER PUBLICATIONS

Bishop, A.; *Future Trends in Weed Management: An Overview*; 3rd International Weed Science Congress; Jun. 2000; pp. 1-4 http:\\www.dpine.tas.gov.au/inter.nsf/WebPages/BHAN-52p269?open.

Harrington, K.C.; *Assessment of Two Herbicide Wiping Devices*; Dec. 2000, New Zealand Plant Protection vol. 53, pp. 276-276.

* cited by examiner

COMBINATION FOLIAGE COMPACTION AND TREATMENT METHOD AND APPARATUS

This application claims priority to U.S. Provisional Patent Application No. 60/394,555 filed Jul. 8, 2002 which is incorporated herein by reference.

STATEMENT OF FEDERAL SPONSORSHIP AND CLAIM TO PRIORITY

The Government of the United States of America has rights in this invention.

FIELD OF THE INVENTION

The present invention relates to a method and apparatus for the application of one or more fluids to foliage. More particularly, the present invention relates to a method and apparatus for foliage compaction and treatment which minimizes spray drift and provides increased control over the application of fluids to the foliage, and provides increased effectiveness of said fluid for the intended purposes.

BACKGROUND OF THE INVENTION

The maintenance of vegetation often includes spraying the foliage with fluids including nutrients, fertilizers, fungicides, herbicides, pesticides and the like. Spraying foliage with chemical herbicides is often used as a means for controlling unwanted vegetation growth. Spray applications are extensively used in various areas with a consequent loss of effectiveness. The disadvantage with such an operation is that a considerable amount of the fluid can be lost through spray drift and over spray. A spray is generally somewhat non-selective and a proportion of the spray will not be applied to the foliage and may instead affect unintended areas and/or plant species. Consequently, there is a significant wastage with such type of application, and a concomitant loss in effectiveness for purposes intended. Additionally, there is an increasing concern with the practice of using sprays containing herbicides and other noxious fluids because of the potential environmental impacts from over spray and spray drift. It is apparent that other means of applying the fluids which will minimize such impacts and increase effectiveness would have a general acceptance.

DESCRIPTION OF THE RELATED ART

Many types of devices and methods are used for the application of fluids to foliage. Considerable effort has been put forth to create devices and methods for efficiently and effectively applying fluids to plants. Such devices are used to apply fluids such as herbicides, fungicides, fertilizer, pesticides and the like.

Many prior art devices developed to minimize spray drift use a contact roller apparatus to apply fluids to foliage. Other prior art devices use a chemical spray system for use during planting.

In general, a disadvantage of prior art devices which use rollers in a wick system is that the rollers apply chemicals unevenly and can easily become dirty and clogged, thus substantially reducing the effectiveness of the device. A hindrance of devices applying fluids during planting is that they cannot be effectively used to apply fluids subsequent to planting.

U.S. Pat. No. 6,190,077 discloses an applicator for applying liquid media comprising an applicator head attached to a stem. The applicator head includes a spherical applicator freely rotatable on an axle which extends at right angles to the stem that is of a length that an operator can hold the stem, and rest the surface of the applicator on the ground. The applicator has a porous resilient envelope which surrounds a sleeve located on the axle, a reservoir in the stem charges the porous envelope with liquid media.

U.S. Pat. No. 4,208,835 discloses an apparatus for applying herbicide to tall weeds which extend above a line formed by the upper reaches of desirable crops is disclosed. The apparatus includes a pair of hydraulic rams for elevating and lowering a rotatably mounted roller which has a covering of nap material such as nylon-dacron carpeting for facilitating the adherence of the herbicide thereto. A fluid pressure system or systems for controlling the flow rate of herbicide to the roller and for controlling the rotational speed of the roller is provided so that the herbicide application characteristics of the apparatus can be varied in accordance with the weed density and height conditions encountered. A wiper for spreading the herbicide and for foaming the herbicide prior to application to the weeds can also be included.

U.S. Pat. No. 4,443,970 discloses an apparatus with a contact bar of permeable, absorbent, exudative material such as a paint roller is attached by a spring bar to a mounting bracket. The contact bar is moistened with a treatment liquid such as a herbicide. Each time the contact bar rubs against a plant, additional herbicide is applied to the contact bar, e.g., a spring arm, carrying the contact bar, can be pushed back by the plant against a microswitch, which will open a solenoid valve. The opening of the solenoid valve may apply liquid to the contact bar by spraying the liquid from a nozzle onto the bar or by feeding liquid through a perforated tube under the surface of the material on the contact bar.

U.S. Pat. No. 4,443,970 discloses a method and apparatus for the application of liquid contact herbicides to plants. A liquid applicator roller is mounted for rotation about a generally horizontal axis and in operative communication with a reservoir of liquid herbicide. The applicator roller is mounted above ground and in position for the peripheral surface thereof to be brought into contact with plants. The applicator roller is moved in the direction generally perpendicular to the axis of rotation of the roller, and powered rotation thereof is effected so that it rotates into contact with plants and continuously transfers liquid from the surface thereof onto the plants, the surface being continuously replenished with liquid from the reservoir. The housing mounting the roller is readily adaptable to mount a hand pushed or pulled unit, or to be mounted on a tractor tool bar. A drive wheel can communicate with a raised surface portion of the liquid applicator roller for effecting rotation thereof. Transfer of herbicide from a liquid pool to the applicator roller can be effected utilizing a sponge or a pair of transfer rollers. The liquid pool is mounted adjacent the axis of rotation of the roller, on one side of the housing.

U.S. Pat. No. 4,488,376 discloses a contact roller herbicide applicator apparatus comprising a substantially cylindrical roller applicator including an internally gravity fed hollow cylindrical roller reservoir having a plurality of feed apertures formed therein in combination with a multiple-ply herbicide applicator member including intermediate porous pad and an outer applicator member in surrounding relationship relative to the hollow cylindrical roller reservoir to apply herbicide in direct contact with weeds or other undesired foliage.

U.S. Pat. No. 6,125,621 discloses apparatus and method for cutting vegetation and simultaneously treating the remaining stems of the cut vegetation with a treatment fluid. The apparatus includes a mower, a cutting blade drive rotatably mounted on the mower, a blade carrier secured to the rotatable drive, and at least one cutting blade assembly rotatably mounted on the blade carrier. The apparatus further includes a fluid container for containing the treatment fluid in a plurality of interconnected, stackable and removable fluid container cells, a pumping device for pumping the treatment fluid to the at least one cutting blade assembly, a flow control device for metering the amount of treatment fluid that is pumped to the at least one cutting blade assembly, and a fluid conduit device for delivering the treatment fluid from the fluid container to the cutting and treating device. The method includes the steps of cutting vegetation with at least one cutting blade, and delivering a treatment fluid to the underside of the at least one cutting blade in a continuous stream so that the treatment fluid is continuously available to the remaining stems of the cut vegetation.

U.S. Pat. No. 6,289,829 B1 discloses a planting machine for delivering liquid pesticides to the soil mixing zone preceding the furrow closing mechanism to effectively distribute liquid pesticide throughout soil covering seed in a furrow. The planting machine has a furrow opening mechanism, seed dispensing means, and furrow closing mechanism and includes a seed positioning means mounted on the seed dispensing means for effectively locating seeds in the furrow. Also, the planting machine includes means for liquid pesticide spray delivery mounted thereon so as to direct a spray towards the furrow closing mechanism and into the soil mixing zone being created by the furrow closing mechanism. The means for spray delivery can be mounted on the conventional seed positioning means as well as independently mounted on the planting machine.

U.S. Pat. No. 6,167,821 B1 discloses a method and apparatus for fumigating soil in a manner to prevent or minimize escape of fumigating gases and in a manner to facilitate the planting of a cover crop at the time of fumigation. An apparatus for simultaneously treating soil with soil fumigant material applied at a full application rate includes a fumigant material applicator applying fumigant below the surface of the soil at a rate of at least 10 gallons per acre. The apparatus further includes a soil leveling apparatus, and a soil packer positioned between the applicator and packer. The apparatus further includes with a cover crop seed planter, with the soil leveling apparatus and packer being positioned between the applicator and planter.

However, there remains a need for an apparatus and method for applying fluids to foliage that reduces over spray and spray drift while applying the fluids evenly to the foliage, thus maintaining effectiveness for the purposes intended.

BRIEF SUMMARY OF THE INVENTION

A first preferred embodiment of the instant invention comprises: a frame; a roller system comprising at least one roller connected to said frame, wherein said roller compacts and/or crimps said foliage when pushed or pulled across said foliage; at least one tank carried by said frame, each tank having an interior space that can contain a fluid; a spray boom connected to said frame, wherein a distance from said spray boom to the foliage may be adjusted; at least one spray nozzle carried by said spray boom; and a hose system connected to said at least one tank and said at least one spray nozzle whereby said at least one spray nozzle is in fluid communication with said interior space of said at least one tank.

A preferred embodiment of the method of the instant invention comprises the steps of: providing a spray apparatus comprising a frame, a height adjustable spray boom connected thereto having at least one spray nozzle, at least one tank having an interior space in fluid communication with said at least one spray nozzle mounted in said frame, and a roller system connected to said frame; providing a fluid in the interior space of said at least one tank; adjusting a height of the spray boom; compacting the foliage with said roller system; and spraying said fluid on the foliage through said at least one spray nozzle.

BRIEF DESCRIPTION OF THE DRAWINGS

FIG. 1 is a side view of a first embodiment of the apparatus of the present invention;

FIG. 2 is a side view of a second embodiment of the apparatus of the present invention;

FIG. 3 is a side view of an alternative embodiment of the present invention.

DETAILED DESCRIPTION OF THE PREFERRED EMBODIMENT

The preferred embodiment of the subject invention will now be disclosed in detail in conjunction with the figures, wherein like parts are designated by like reference numerals, throughout the several views. While the present inventive subject matter is applicable for use with a variety of fluids including fungicides, fertilizers, water and pesticides, the preferred embodiment, discussed below, is a combination weed compaction and herbicide treatment apparatus and method.

In the present invention a roller can be pushed or pulled across a field of plants, thereby forcing the plants very close to the ground. The height of at least one spray nozzle directly following the roller can be adjusted such that the nozzle is very close to the foliage. The combination of the roller to compact the foliage and the height adjustability of the spray nozzle allows fluid to be released very near the plants, thereby increasing the amount of fluid transferred to the plants' surface, lowering the amount of herbicide lost due to spray drift and over spray, and increasing effectiveness of intended fluid(s).

Referring now to the drawings, FIG. 1 shows a side view of the foliage compaction and treatment apparatus 1 which may be mounted to the back of a self propelled vehicle (not shown). Apparatus 1 has a frame 2 with a top side 4 and a bottom side 5. Frame 2 may be constructed of pipe, hollow tubing or other materials known to those skilled in that art. Vertical roller frame mounting brackets 6 extend downward from frame 2 and can be structurally integrated into frame 2, as in FIG. 1, or can be attached to frame 2 by other means known in the art such as by weld, bolts or screws. A roller frame 12 is rotationally attached to vertical roller frame mounting brackets 6 by a pin 14. Shock mounting brackets 10 are attached to mounting brackets 6 above pin 14 and to roller frame 12. At least one shock absorber(s) 16 is connected between respective shock mounting brackets 10 on vertical roller frame mounting brackets 6 and roller frame 12. Shock absorber(s) 16 is preferably high travel shock absorber(s) and is biased to place a constant downward pressure on roller frame 12 and thereby roller 24. The constant downward pressure applied to roller frame 12 and roller 24 ensures proper compaction and/or crimping of the foliage by roller 24 during use of apparatus 1.

A cable mounting hook 18 is affixed to roller frame 12. A lifting device 20 is attached to the bottom side 5 of frame 2. Lifting device 20 can be operated manually, operated using a power source or operated with a hydraulic ram. A cable 22 extends from lifting device 20 to cable mounting hook 18. Lifting device 20 is used to raise and lower roller frame 12. Roller frame 12 may be raised by lifting device 20 when apparatus 1 is not in use, facilitating ease of transport. A roller 24 is rotationally attached to roller frame 12. A plurality of crimping members 26 extend radially from roller 24. When roller 24 is in use, crimping members 26 crimp the foliage that is contacted by roller 24. Crimping of the foliage by crimping members 26 provides for more effective and efficient compaction of the foliage. In the embodiment represented by FIG. 1, frame 2 is mounted to a self-propelled vehicle such as an ATV or tractor(not shown). When in use, roller 24 is lowered to a position where roller 24 comes into contact with the foliage to be compacted and treated. As the self-propelled vehicle moves apparatus 1, roller 24 rotates and crimping members 26 score the foliage while roller 24 compacts the foliage in preparation for treatment with a fluid 31. At least one shock absorber(s) 16 provide a constant downward force on roller 24, allowing roller 24 to compact foliage over uneven ground.

At least one pressure tank 28, and at least one fluid tank 30 are mounted in frame 2. A pressure supply hose 32 is attached at one end to pressure tank outlet 34 of pressure tank 28. An opposite end of pressure supply hose 32 is attached to fluid tank inlet 36 of fluid tank 30. Pressure supply hose 32 supplies pressure from pressure tank 28 to fluid tank 30. A fluid supply hose 37 having an inlet opening on an interior of fluid tank 30 extends from fluid tank outlet 40 to a bottom of fluid tank 30. A manifold supply hose 38 is attached at one end to fluid tank outlet 40 on an exterior of fluid tank 30. Fluid tank 30 contains fluid 31 to be applied to the compacted foliage. An opposite end of manifold supply hose 38 is attached to manifold inlet 42 of manifold 44. A spray nozzle supply hose 46 is attached at one end to manifold outlet 48 of manifold 44. An opposite end of spray nozzle supply hose 46 is attached to spray nozzle 50. Spray nozzle 50 is preferably a flat fan spray nozzle.

Spray nozzle 50 is attached to spray nozzle mounting bracket 51 located on horizontal spray boom frame 54. Horizontal spray boom frame 54 is attached to lower vertical spray boom mounting frame 56. Lower mounting frame 56 is attached telescopically to upper vertical spray boom mounting frame 58. A plurality of holes 60 in lower mounting frame 56 and hole 62 in upper mounting frame 58 are disposed such that a selected one of the plurality of holes 60 in lower mounting frame 56 can be aligned with hole 62 of upper mounting frame 58. A spray boom pin 64 can be placed through hole 62 and the selected one of holes 60 to secure lower mounting frame 56 to upper mounting frame 58. A distance between spray nozzle 50 and compacted foliage can be adjusted by disposing pin 64 in the selected hole 60 corresponding to the desired distance. Other methods of adjusting the height of lower mounting frame 56, such as by a lifting device system, are well known in the art.

Multiple pressure tanks 28 and/or fluid tanks 30 can be used in apparatus 1. In the event that multiple fluid tanks 30 and pressure 28 tanks are used, multiple hoses 32 and 38 can also be used. Further, in the event that multiple spray nozzles 50 are used, multiple hoses 46 can also be used.

Apparatus 1 can operate in front of or behind a self-propelled vehicle provided roller 24 is in front of spray nozzle 50 based on the direction of travel of said apparatus.

Functionally, pressure supplied from pressure tank 28 passes through hose 32 to fluid tank 30, forcing fluid 31 contained therein into an inlet opening of fluid supply hose 37 at a bottom of fluid tank 30. Fluid supply hose 37 supplies fluid 31 to fluid tank outlet 40 where fluid 31 exits fluid tank 30 and enters manifold supply hose 38 and is delivered to manifold 44. Fluid 31 exits manifold 44 through hose 46 which delivers fluid 31 to spray nozzle 50 where it is applied to compacted foliage. Control 53 controls the flow of fluid 31 from manifold 44 to spray nozzle 50. Control 53 allows the operator of apparatus 1 to select the area of application and the amount of fluid 31 to be applied to the compacted foliage (not shown). As illustrated in FIG. 1, control 53 may be connected to manifold 44, however, control 53 may also be mounted to pressure tank 28 or fluid tank 30 in order to control flow of fluid 31.

Fluid 31 may be a liquid or a gas. Further, fluid 31 may be a pesticide, herbicide, fungicide, molluscide, nematicide, rodenticide, acaricide, miticide, fertilizer, growth hormone, nutrients, pheromone, microorganism or biological preparation, or any combination thereof.

Figure 2:
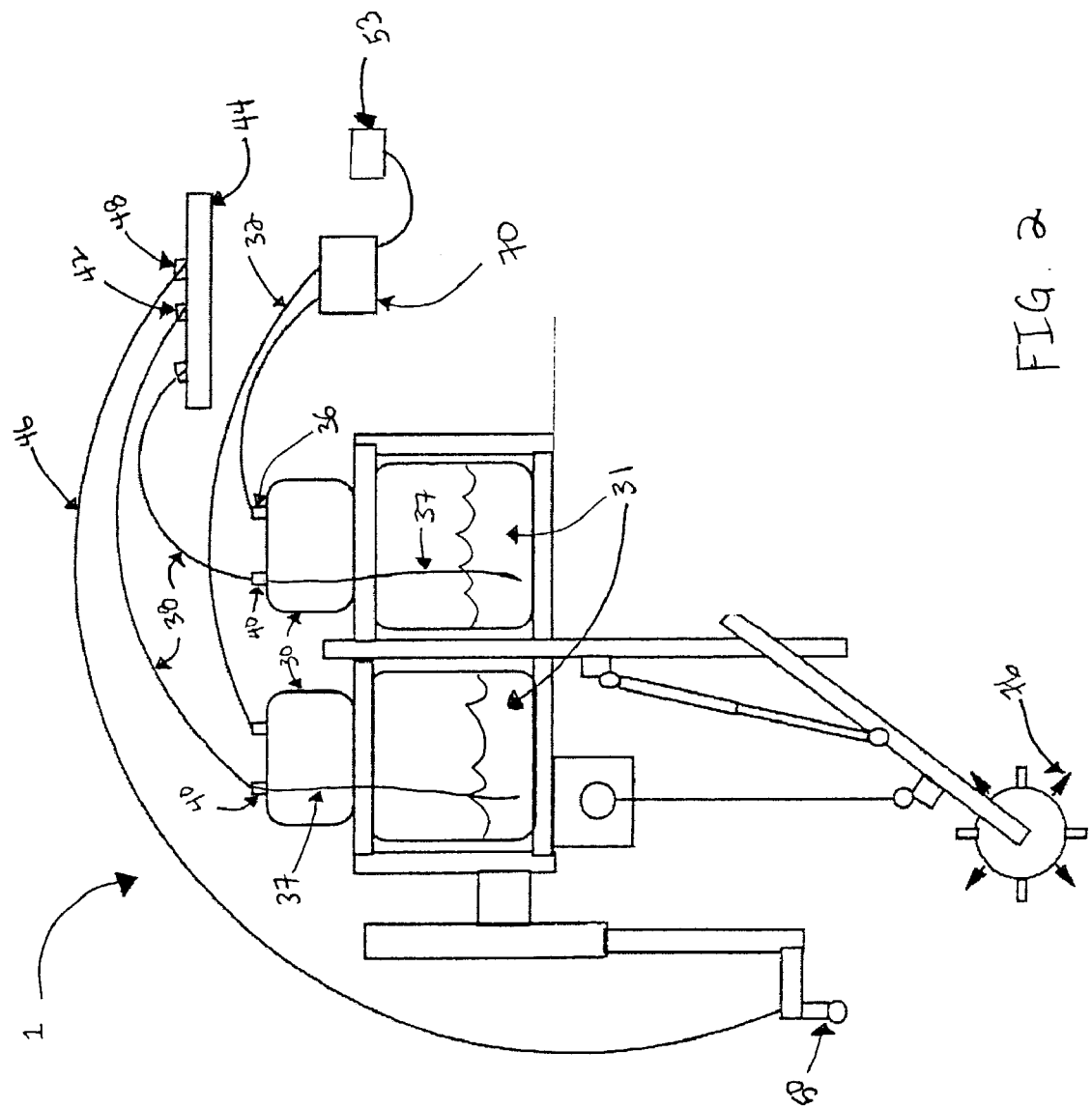

FIG. 2 shows an alternate embodiment of apparatus 1. In the embodiment of FIG. 2, pressure supply hose(s) 32 is attached at one end to pump 70. An opposite side of pressure supply hose(s) 32 is attached to fluid tank inlet(s) 36 of fluid tank(s) 30. Fluid supply hose(s) 37 having an inlet opening on an interior of fluid tank(s) 30 extends from fluid tanks outlet(s) 40 to a bottom of fluid tank(s) 30. Manifold supply hose(s) 38 is attached at one end to fluid tank outlet(s) 40 on an exterior of fluid tank(s) 30. Opposite ends of manifold supply hose(s) 38 is attached to manifold inlets 42 of manifold 44. Spray nozzle supply hose(s) 46 is attached at one end to manifold outlet(s) 48. An opposite end of spray nozzle supply hose(s) 46 is attached to spray nozzle(s) 50. In operation, pump 70 supplies pressure to fluid tank(s) 30 through pressure supply hose(s) 32. Pressure supplied by pump 70 forces fluid 31 through fluid supply hose(s) 37 to fluid tank(s) outlets 40. Fluid 31 exits fluid tanks outlet(s) 40 and enters manifold supply hose(s) 38 which deliver fluid 31 to manifold 44. Fluid exits manifold 44 through spray nozzle supply hose(s) 46 which carries fluid 31 to spray nozzle(s) 50 which disperses fluid 31 onto the compacted foliage. Spray nozzle(s) 50 is preferably a flat fan spray nozzle.

A control 53 is attached to pump 70 to control the flow of fluid 31 from manifold 44 to spray nozzle 50. Control 53 allows the operator of apparatus 1 to select the area of application and the amount of fluid 31 to be applied to the compacted foliage (not shown). As illustrated in FIG. 2, control 53 may be connected to pump 70, however, control 53 may also be connected to fluid tanks 30 to control flow of said fluid 31.

Single or multiple fluid tanks 30 can be used in apparatus 1. In the event that multiple fluid tanks 30 are used, multiple hoses 32 and 38 can also be used. Further, in the event that multiple spray nozzles 50 are used, multiple hoses 46 can also be used.

FIG. 2 also illustrates a plurality of spikes 76 which can be attached to roller 24 to aerate the earth during treatment of compacted foliage. The number and pattern of said plurality of spikes 76 contained on roller 24 can be varied based on a desired aeration pattern.

Figure 3:
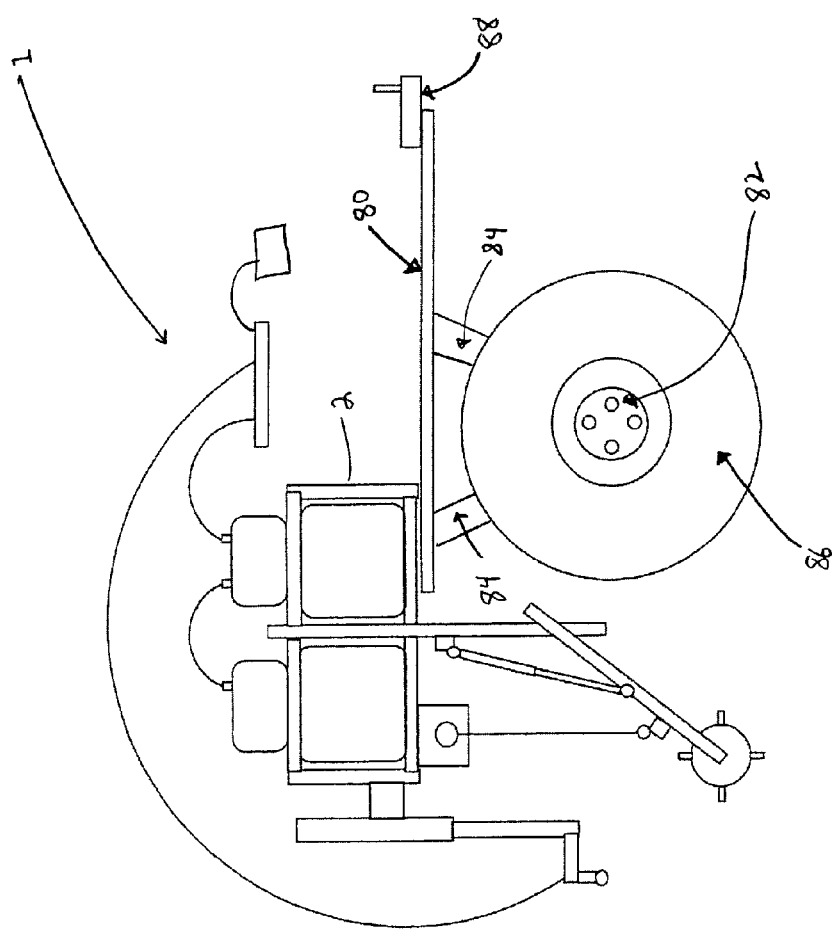

FIG. 3 shows an alternate embodiment on the present inventive apparatus. The embodiment in FIG. 3 is similar to the apparatus of FIG. 1, except that the embodiment of FIG.

3 is towed behind or pushed in front of a self-propelled vehicle as opposed to being mounted on a self-propelled vehicle. Accordingly, only those portions of the apparatus not previously described in FIG. 1 will be discussed below.

Referring now to FIG. 3, frame 2 is mounted to towing frame 80. Axle 82 is attached to towing frame 80 via axle brackets 84. A pair of wheels 86 are attached to opposite ends of axle 82. A tow hook 88 is attached to towing frame 80 such that apparatus 1 can be pulled or pushed by a self-propelled vehicle (not shown).

The invention being thus described, it will be obvious that the same may be varied in many ways. Such variations are not to be regarded as a departure from the spirit and scope of the invention and all such modifications are intended to be included within the scope of the following claims.

The invention claimed is:

1. An apparatus for compacting foliage and applying a fluid thereto comprising:
    a frame;
    a foliage compaction system including a foliage compaction member and first and second links, the first link mounting the foliage compaction member to the frame and being pivotally connected to the frame to allow the foliage compaction member to pivot relative to the frame, further comprising a lifting device attached to said frame including a cable, the second link being a biasing member connected between the frame and the first link for applying a downward force independent of gravity on the first link so as to bias the foliage compaction member to compact said foliage;
    at least one tank defining an interior void that can contain a fluid; and
    at least one spray nozzle connected to said frame and positioned to direct a spray of fluid to the compacted foliage via a conduit placing the spray nozzle in fluid communication with the interior void of the tank.

2. The apparatus of claim 1 wherein said fluid comprises a gas.

3. The apparatus of claim 1 wherein said fluid comprises a liquid.

4. The apparatus of claim 3 wherein said liquid comprises a solution.

5. The apparatus of claim 1 wherein said fluid is selected from a group consisting of: pesticide, herbicide, fungicide, molluscide, nematacide, rodenticide, acaricide, miticide, fertilizer, growth hormone, nutrients, pheromone, microorganism or biological preparation or combination thereof.

6. The apparatus of claim 5 wherein said fluid is a pesticide.

7. The apparatus of claim 1 wherein said compaction system is height adjustable.

8. The apparatus of claim 1 further comprising a pump connected to said hose system that can pump the fluid to said at least one spray nozzle.

9. The apparatus of claim 8, wherein said pump comprises an electric pump.

10. The apparatus of claim 1 further comprising a plurality of tanks.

11. The apparatus of claim 10, further comprising a pressure tank and a fluid tank, an interior of said pressure tank being in fluid communication with an interior of said fluid tank, and whereby said pressure tank provides a pressure to said fluid tank.

12. The apparatus of claim 11 further comprising a pump connected to said hose system that can pump the fluid from said fluid tank to said spray nozzle.

13. The apparatus of claim 1 further comprising a control that can control flow of the fluid from said at least one tank to said at least one spray nozzle.

14. The apparatus of claim 13 wherein said control can control a supply of power to a pump.

15. The apparatus of claim 13 wherein said control can control a flow of fluid from said at least one tank.

16. The apparatus of claim 13 wherein said control can control a supply of pressure to said interior space of said at least one tank.

17. The apparatus of claim 1 further comprising a lifting device connected between said frame and said compaction system, whereby said lifting device can raise and lower said compaction system.

18. The apparatus of claim 1 wherein said at least one spray nozzle is a flat fan nozzle.

19. The apparatus of claim 1 wherein the compaction system comprises at least one roller coupled to said frame via the first link.

20. The apparatus of claim 19 wherein said roller compacts and crimps said foliage when pushed or pulled across said foliage.

21. The apparatus of claim 19 further comprising a plurality of protrusions extended radially from said roller along a length thereof,whereby said plurality of protrusions crimp the foliage.

22. The apparatus of claim 19 further comprising a plurality of spikes extending radially from said roller, whereby said plurality of spikes aerate soil.

23. The apparatus of claim 19 wherein the biasing member includes at least one shock absorber connected to said compaction system that can regulate a pressure between said roller and the foliage.

24. The apparatus of claim 23 wherein said at least one shock absorber is a high travel shock absorber.

25. The apparatus of claim 1, wherein the spray nozzle is connected to the foliage compaction system via a spray boom that is adjustable to adjust a distance from said spray nozzle to the foliage.

26. The apparatus of claim 25, wherein said spray boom is disposed rearward of said compaction system in a direction of said apparatus.

27. The apparatus of claim 1, wherein the biasing member includes a shock absorber.

* * * * *